(12) United States Patent
Williams et al.

(10) Patent No.: US 12,718,476 B2
(45) Date of Patent: Aug. 25, 2026

(54) METHOD AND A SYSTEM FOR GENERATING 3D INFORMATION RELATING TO A SCENE OR AREA COMPRISING AN OBJECT

(71) Applicant: Carnegie Robotics, LLC, Pittsburgh, PA (US)

(72) Inventors: Daniel David Williams, Pittsburgh, PA (US); Stephen Paul Elizondo Landers, Pittsburgh, PA (US); John Paul Thomas Atkinson, Pittsburgh, PA (US)

(73) Assignee: CARNEGIE ROBOTICS, LLC, Pittsburgh, PA (US)

( * ) Notice: Subject to any disclaimer, the term of this patent is extended or adjusted under 35 U.S.C. 154(b) by 153 days.

(21) Appl. No.: 18/468,056

(22) Filed: Sep. 15, 2023

(65) Prior Publication Data

US 2025/0095286 A1 Mar. 20, 2025

(51) Int. Cl.

| | |
|---|---|
| ***G06T 17/00*** | (2006.01) |
| ***G06T 7/13*** | (2017.01) |
| ***G06T 7/50*** | (2017.01) |

(52) U.S. Cl.
CPC ................ *G06T 17/00* (2013.01); *G06T 7/13* (2017.01); *G06T 7/50* (2017.01); *G06T 2207/10012* (2013.01)

(58) Field of Classification Search
CPC ......... G06T 17/00; G06T 17/05; G06T 7/593; G06T 2207/10012; G06T 2207/10028; G06T 7/11; G06T 7/85; G06T 7/00; G06T 7/13; G06T 2207/10021; G06T 2207/20228; G06T 7/596; G06F 18/254; H04N 13/122; H04N 13/204; H04N 2013/0074; H04N 2013/0092
See application file for complete search history.

(56) References Cited

U.S. PATENT DOCUMENTS

2020/0349366 A1* 11/2020 Takemura ............ H04N 13/286
2022/0254123 A1* 8/2022 Watanabe ........... G06F 3/04845

OTHER PUBLICATIONS

Boulch, Alexandre et al., "SnapNet: 3D Point Cloud Semantic Labeling With 2D Deep Segmentation Networks", Computers & Graphics, Dec. 15, 2017, pp. 1-16.
Sarker, Sushmita et al., "A comprehensive overview of deep learning techniques for 3D point cloud classification and semantic segmentation", Machine Vision and Applications, May 18, 2024, 54 pages, vol. 35, No. 67.

* cited by examiner

*Primary Examiner* — Hau H Nguyen
(74) *Attorney, Agent, or Firm* — Workman Nydegger

(57) ABSTRACT

Three-dimensional (3D) information is generated from two or more two-dimensional (2D) images. In the 2D images, one or more objects are identified, and either a corresponding portion of the 3D information representing the same object is identified and/or where the 3D information is corrected correspondingly. The correction may be the leaving out of 3D information representing the object or the correction of the 3D information based on knowledge of a shape of the object.

16 Claims, 3 Drawing Sheets

METHOD AND A SYSTEM FOR GENERATING 3D INFORMATION RELATING TO A SCENE OR AREA COMPRISING AN OBJECT

BACKGROUND

The present invention relates to a method and a system for generating 3D information relating to an object and in particular for generating information relating to the object from a 2D image of a number of images forming a stereo image pair, and generating 3D information from the stereo image pair taking into account the information from the 2D image. In one situation, the object may be classified in the 2D image, so that the corresponding 3D information relating to the object inherits that classification. In another situation, the object may be identified as irrelevant in the 2D information and thus ignored in the generation of the 3D information.

Due to the often imperfect and incomplete nature of 3D information, it may be difficult to determine what object or what type of object a portion of the 3D information relates to. Clearly, a low-hanging lamp over a road is more serious than a flying balloon in the same position over the road. Thus, in some instances, it would be desired to be able to classify an object in order to take the type of object into account either when generating the 3D information or when using it, such as for navigation.

SUMMARY

A first aspect of the invention relates to a method of generating object information from a stereo image pair, the method comprising:

- obtaining a stereo image pair comprising a first image and a second image of an area or scene comprising a plurality of objects,
- identifying, in the first image and/or the second image, a first object of the plurality of objects,
- generating, from the stereo image pair, 3D information relating to the scene or area, and
- identifying, based on the identified first object, a portion of the 3D information relating to the first object, the object information relating to the generated information.

In the present context, the information is 3D information relating to the area or scene. One or more of the objects therein may be represented in this 3D information but may be identified, classified or analyzed in one or both of the first and second images.

3D information may be represented in a multitude of manners. A widely used type of 3D information is a point cloud which is an assembly or group of points or coordinates each identifying or representing a surface of an element or object in the scene or area in question. The point cloud may represent, in each of a plurality of directions from a predetermined spot, such as a position of a camera, lidar or other sensor, the closest object in the scene or area in that direction. Information of this type is often used for navigating in the scene or area.

Other common types of 3D information are meshes (often triangulated meshes), parametric surface representations, voxel-based representations, and "surfels" representing surface patches.

3D information may, alternatively or in addition to this, be represented in other manners, such as by definitions or descriptions of individual objects or surfaces in the area or scene. 3D information relating to an object in the form of a cube may be defined by its side length and direction/angle/distance from a point of viewing the cube.

A scene or area may be any type of area, room, venue, or the like, which may be depicted or represented by the stereo image pair. A storage facility, an airport terminal, a supermarket, a portion of a city or town, a road and its surroundings, or the like may be the scene or area.

An object may be anything positioned in the scene or area. Objects may be classified or of different types and may be divided into types or classes depending on the actual situation and the use or purpose of the 3D information. If the scene or area is a portion of a town or city and the purpose is navigation of a vehicle, objects may be buildings, trees, bushes, lamp posts, cars, bicycles, scooters, mopeds, pedestrians, animals, birds, airplanes, the sky to name a few. If the scene or area is a portion of a port or coastal stretch, objects may be poles, quays, boats, vessels, swimming persons, buoys, birds, airplanes, the sky, clouds or the like. If the scene or area is an airport terminal, objects may be pillars, walls, passengers, luggage, waste bins and the like.

An object may be a number of elements in the area or scene, such as a number of persons, trees, poles, cars, buildings or the like. An object may be identified using e.g. semantic segmentation networks which are capable of identifying not only a collection of pixels representing a single person, tree or the like but all pixels representing any number of persons, trees or the like in the image. An object may represent not only multiple elements of the same type, such as multiple vehicles, but also multiple types of elements in the image, such as stationary elements (houses, trees, pillars, and/or quays or the like), dynamic objects (persons, animals, and/or vehicles and the like), or the like. An object may be represented by a plurality of pixels which may form one or more groups or clusters of interconnected/neighbouring pixels in the image.

Different objects, or different types of objects, may have different importance, relevance or impact in different situations. Thus, the desire to know which portions of the 3D information relates to what types or categories of objects may be highly relevant for e.g. navigation purposes.

In principle, the 3D information could instead derived in any desired manner, such as using a LIDAR, so that a camera would be directed toward the area or scene. Then, a spatial or angular correlation is desired between the 3D information and the image so that a feature in a pixel or group of pixels in the image may be identified in the 3D information.

In the present context, the 3D information is generated from a stereo image pair, where a stereo image pair is at least two 2D images of the scene or area taken from different positions. A stereo camera may be used for generating the stereo image pair, where a stereo camera comprises two cameras positioned in a predetermined position in relation to each other and both imaging the scene or area. Alternatively, the same camera may be moved while or between taking the images. Possible technologies using such movement are "motion stereo" and "structure from movement" (SFM).

The scene or area may be defined as the scene or area imaged by both cameras of a stereo camera, if a stereo image camera is used.

Often, the images of the stereo image pair are obtained at least substantially simultaneously, as it is desired that all portions of the images are represented in the same position. If the scene or area alters only very slowly, a relatively larger period of time may be allowed between the points in time of generating the images of the stereo image pair.

The stereo image pair comprises at least a first and second image. Additional images may be used if desired. An image in this context may be a standard 2D image as generated by a camera, such as a camera having an imaging sensor (often a CCD or CMOS image sensor) and optics imaging the scene or area onto the sensor.

As described above, the first and second images may be obtained in any manner.

From the first and/or the second image, a first object of the plurality of objects is identified. Objects may be identified or even classified in a number of manners. A vast number of tools exist for identifying different types of elements or objects in images. Persons may be identified or even recognized in images using tools available on the WWW, as may cars and other objects. Thus, tools exist that may analyze an image and identify different types of objects therein. The identification may be both determining what a portion of the image represents as well as where in the image that object is represented.

An object, such as a bird, may then be identified as may a position in the image where that object is positioned. An outline or boundary of that object may be determined, as is described below.

The type of object may be determined, such as "dynamic", "stationary", "animal", "vehicle", "person", "relevant", "irrelevant", "ego vehicle", "water", "sky", "dock", "foliage", "human", "animal", "bird", "rope", "sailboat", "jetski", "unpowered boat", "other vehicle", "navigation sign", "debris", "camera artifacts", "other" or the like.

The generation of the 3D information from the stereo image pair may be as performed historically where for each of a plurality of pixels in the first image, a corresponding pixel or location is identified in the other image. From the displacement of the pixels or the displacement between the pixel and the corresponding location, a distance to the corresponding element in the scene or area may be determined and thus the 3D position thereof. This process often is called determining the "disparity".

Other manners of determining the 3D information from a stereo image pair may be inference using convolutional neural nets, SFM, depth from focus, depth from scale, structured light, time-of-flight information when specialised imagers are available, or other approaches.

Further below, adapted manners of generating the 3D information are described.

Having now identified the first object and/or one or more pixel groups/clusters representing the object, information relating to the object may then be used in the generation or interpretation/use of the 3D information. This may be achieved in a number of manners, which may depend on the situation, the desired outcome and the purpose of the 3D information as well as the type or category of the first object.

If the first object is a stationary object and the purpose of the 3D information is navigation or position determination, the 3D information would normally retain the portions thereof relating to and/or representing the first object. On the other hand, if the first object is dynamic or even irrelevant, the corresponding portions of the 3D information may be ignored or not even generated. This is described further below.

The 3D information relating to the object may be utilized in accordance with the identity of the object. Below, a number of manners of utilizing the identity of the object are described.

According to the invention, a portion of the 3D information is identified based on the identified first object, where the portion relates to the first object, the object information relating to the generated information.

Thus, a portion of the 3D information is identified. This portion may then be treated according to a number of considerations. Now that the first object is identified from the first/second image, no identification or categorization is required in the more complex and often noisier or more difficult to interpret 3D information.

An object may be relied on to have certain traits, limits or behaviour. For example, a house is expected to not move. A bicycle or a row boat are relied on to have a certain maximum speed and manoeuvrability, so that a safety envelope may be provided around them to avoid collision with them. Depending on the type of object, the envelope may be defined larger or more narrow. It may be desired to give a person a wider berth or even move away from the person. If both grass and sidewalk have been identified as objects, it may be decided to traverse the sidewalk to minimize damage to the grass.

For example, if the first object is identified as a stationary object, the portion may be relied on during navigation or position determination.

In another example, the portion of the 3D information may be adapted based on knowledge of the first object or a portion thereof and thus based on the identification of the first object.

In one embodiment:

the identifying step comprises identifying also a second object of the plurality of objects, the generating step comprises excluding a portion of the stereo image pair representing the second object.

This situation may arise when the second object is a dynamic object, an object obviously not relevant, an object too small to be of concern, or the like.

Alternatively, dynamic objects may be tracked by associating 3D information across multiple frames. Based on such information, further information may be derived as to the object and/or the type thereof. The speed and/or maneuverability determined from the tracking may assist in determining a type of the object. A bicycle travelling at 45 km/h may be assumed to be an electrical bike and not a manually powered one.

The excluding of the portion may be achieved by allocating, to the corresponding portion of the first and/or second image, a predetermined pixel value to the image—and then adapting the process of generating the 3D information to not generate 3D information corresponding to the pixels in the portion of the first/second image. The generating process may be adapted to not generate 3D information when a pixel has this particular value. Alternatively, the pixels of the portion of the first/second image may be identified (such as by their coordinates) for the generating process or step for it to then not generate 3D information for such identified pixels.

Alternatively, the generating step may exclude the portion by allocating 3D information relating to the portion, having a distance to the center or point of generation of the stereo image pair, which is larger than a predetermined distance. When used for navigation, very distant elements are not necessarily taken into account so that the portion of the 3D information becomes irrelevant for e.g. navigation. In other situations, remote objects or elongate objects may be used in different manners. The horizon may be used for ensuring that the two images are aligned. The horizontal horizon may be used for deriving a correlation between the images or one may be rotated in relation to the other in order to have the horizon be horizontal in both images.

A remote lighthouse may be used for navigation, as its position is well-defined, such as by triangulation with other well-known elements.

Further alternatively, the portion of the 3D information may be marked or identified as irrelevant or ignorable, such as by providing the points of the point cloud with a particular color or value, so that a process utilizing the 3D information can disregard it or put less emphasis on it.

When used for navigation or the like in a nautical setting, the second object may be the sky, a cloud, a seagull, the horizon or the like, all of which are irrelevant when navigating a boat but which may be visible in the first/second images. Thus, the 3D information may be adapted or improved by removing such objects therein which are not relevant for the purpose in question, such as small animals, birds, balloons and the like being irrelevant for navigation or position determination purposes.

When used for navigation on land, the same considerations may be used, where seagulls are less often seen but mice or blowing leaves may cross the road without a vehicle altering its trajectory for that reason.

In that or another embodiment, the method further comprises the step of deriving shape information relating to a shape of a surface of the identified first object, wherein the generating step comprises generating, based on the shape information, a portion of the 3D information relating to the surface to have a shape corresponding to the shape of the surface.

The generation of the 3D information may be flawed, so that the shape of an object as indicated in the 3D information may differ from the actual shape thereof. However, the shape may be known based on a type or category of the first object, or the shape may be inferred or derived based on knowledge thereof, or the shape may be inferred based on information encoded in a convolutional neural network. Then, this shape may be used for adapting the 3D information to more closely reflecting this shape.

The shape may be that of all of the object or a portion thereof. Where the hull of boats may have very different shapes, the sails thereof may have more similar shapes, as they are defined by the masts/rigging and the wind.

The shape may be derived from a 3D model of the first object or from assumptions of the shape based on typical shapes of similar objects. The shape of a Toyota Prius may be stored in a database and may be used when the first object is identified as a Toyota Prius. The distance to the car as well as its rotation in relation to the viewer may easily be determined, and this information may be used for adapting the 3D information to the model.

The shape of a wall surface may be assumed to be plane, so that the 3D information may be adapted to reflect a plane surface.

This has a number of advantages, such as if a robot is desired to navigate along the surface. If the surface, from the 3D information, seems uneven, the robot's movements will be more uneven (and thus usually slower) than if the surface actually is more plane and the 3D information has been adapted to reflect a plane surface.

Also, or alternatively, a deviation of the 3D information from the expected shape might also motivate closer inspection of the object or a portion thereof. For example, the system may direct its attention to the object which has been inadequately sensed or inaccurately labelled.

In those embodiments or in another embodiment, the identifying step comprises determining an edge or outline of at least a portion of the first object and deriving outline information, and the generating step comprises generating the 3D information based also on the outline information.

When generating 3D information, the edge of an object in one distance from the stereo camera, where the background is at a different distance, may give rise to flawed 3D information at that outline.

Determining the outline or edge, such as a group of outer pixels relating to the first object, may be used in the determination of the 3D information, as the corresponding 3D information is known to relate to the object, whereas those outside of the object may be allowed to be at a different distance.

For example, where two edges (perhaps from two different objects, or two different regions) intersect, the image often has strong gradients that make the intersection look like a very good "feature" to track. But the apparent position of that feature is affected by parallax between the differing depths of the two objects. This means the "feature" moves unpredictably as the camera and or objects in the scene move. These fake, occlusion-based features can be ignored based on knowledge of where the intersections between the outlines are.

In any of the above embodiments or in a separate embodiment, the method further comprises the step of navigating in the area or scene based on the identified portion of the 3D information, wherein the first object is a stationary object.

Navigation is often based on a position determination, such of the system in question vis-à-vis the stationary objects. Dynamic objects are often not used for position determination but navigation may be affected by dynamic objects in order to avoid collision with the dynamic objects.

The navigation may be navigation of a vessel, vehicle, robot or the like in the area or scene. In this situation, the first object may be interpreted or classified to be a stationary object, so that the navigation is based on the portion of the 3D information relating to the stationary object. Often, the vessel/vehicle/robot will comprise means, such as a stereo camera or a plurality of cameras, for generating the first and second images.

Objects may be identified which are classified as stationary, so that navigation is performed in relation thereto. Other objects may be classified as dynamic, whereby collision avoidance may be made in relation to such objects, which may be other vessels/vehicles/robots, persons, or the like. Further objects may be classified as irrelevant, such as a balloon, a cloud, a treetop or the like, and these objects may be ignored or given a low or no importance or weight in different manners, such as by not providing the corresponding 3D information in the information based on which the navigation takes place.

An object may be assigned an expected behaviour. A boat is expected to stay on the surface of the water but can change course and speed. A mooring buoy stays on the surface and is fairly stationary but may be affected by wind and current so that its position is not fixed.

In another embodiment, wherein the second object is a dynamic object, the method further comprising the step of navigating in the area or scene based on the generated 3D information.

A second aspect of the invention relates to a system for generating object information from a stereo image pair, the system comprising:

an obtaining element configured to obtain a stereo image pair comprising a first image and a second image of an area or scene comprising a plurality of objects, a controller configured to:

identify, in the first image and/or the second image, a first object of the plurality of objects, generate, from the stereo image pair, 3D information relating to the scene or area, and identify, based on the identified first object, a portion of the 3D information relating to the first object, the object information relating to the generated information.

It is noted that all aspects, embodiments, situations and considerations of this and the above aspect of the invention may be equally relevant to and combined with any embodiment, situation and/or consideration of any of the other aspects of the invention.

In this context, the system may be a sensor system, a navigation system or the like for providing the 3D information. As will be clear further below, the system may form part of a robot, vehicle or vessel for aiding that vessel/vehicle/robot in navigating in the area or scene.

In this context, the system needs only comprise the obtaining element and the controller. These elements may be fixed in relation to each other, but it is entirely possible for the obtaining element and the controller to be remote from each other and for communication elements to be provided for the obtaining element and the controller to communicate over wires and/or wirelessly.

The obtaining element may be a stereo camera, a single camera, multiple independent cameras or an element configured to receive information from such cameras. The first and second images of the stereo image pair are images of the same scene or area, or at least comprising therein that scene or area, and which are obtained from different positions. Often, the first and second images are provided or generated at at least substantially the same point in time.

Generation of the 3D information from the first and second images is, as described above, often performed by matching pixels in one image to those of the other image. Then, the cameras are preferably positioned, relative to each other, at a predetermined distance and with a predetermined elevation and direction, so that the position of an element depicted in both images may be determined from the pixels in the two images representing the element.

The controller may be a processor, server, ASIC, DSP, or the like. The controller may be provided at the camera or be remote therefrom, such as forming part of a system comprising the camera or remote also to the system, such as if cloud-based. It may be monolithic or formed by a number of elements which are in communication with each other, wired or wirelessly. The controller may comprise additional elements, such as memory, communication elements and the like.

In addition to the obtaining element and the controller and any other elements of the controller, the system may comprise all of or components of a vehicle, vessel, robot or the like using the output of the controller for e.g. navigation, position determination, collision avoiding or the like.

The stereo image pair, the first and second images, the 3D information, the object, the identification and the generation of the 3D information may be as described above.

In one embodiment, the controller is configured to:

have the identifying step comprise identifying also a second object of the plurality of objects, have the generating step comprise excluding a portion of the stereo image pair representing the second object.

As described above, the second object may be of a type or category which may not or need not be used for navigation or the like. Nevertheless, when the object is present in the area or scene, it may be represented in the first and second images and may be handled or taken care of as described above.

In one embodiment, the controller is further configured to:

derive shape information relating to a shape (determined, estimated, known) of a surface of the identified first object, and have the generating step comprise generating, based on the shape information, a portion of the 3D information relating to the surface to have a shape corresponding to the shape of the surface.

As mentioned above, a memory may comprise a number of models of shapes of different objects so that when an object has been identified, the shape thereof may be obtained or determined and used for adapting the 3D information. Alternatively, an object, or a portion thereof, may be assumed to have a particular shape, which is then used. An assumed shape may be determined from the first/second image and/or from an assumption of a category/type of the object, for example.

The determination or assumption of the shape may be made by the controller based on information, such as 3D models or other knowledge, which may be correlated with the identity of the object.

In one embodiment, the controller is configured to have the identifying step comprise determining an edge or outline of at least a portion of the first object and deriving outline information, and the generating step comprise generating the 3D information based also on the outline information. This is described further above.

In a particularly interesting embodiment, the controller is further configured to navigate, such as navigate a system, in the area or scene based on the identified portion of the 3D information, wherein the first object is a stationary object. Thus, the system may comprise or be a vessel, a vehicle, a robot or the like. This vessel/vehicle/robot may comprise wheels/hull/tracks or the like as well as a drive, such as a motor, rotor, propeller, or the like configured to drive the vessel/vehicle/robot in a predetermined direction. The vessel/vehicle/robot may comprise other sensors configured to sense obstacles, such as persons, and may be configured to carry a payload, such as parcels or fast food, perform an operation, such as cleaning, or the like.

Navigation, collision avoidance and the like are described above. From images taken at different points of time, a difference in position vis-à-vis a stationary object may be used for deriving a heading and speed of the present system.

In one embodiment, as is also described above, the second object is dynamic, where the controller being configured to navigate in the area or scene based on the generated 3D information. This navigation may be of the vessel/vehicle/robot described above.

As mentioned above, a determined behaviour and/or an expected behaviour of one or more objects may be used for generating a trajectory or path for the system. Different safety distances/envelopes may be determined for different behaviour or different object types.

A third aspect of the invention relates to a method of generating 3D information from a stereo image pair, the method comprising:

obtaining a stereo image pair comprising a first image and a second image of an area or scene comprising a plurality of objects, identifying, in at least one of the first image and the second image, a first object of the plurality of objects, and generating, from the stereo image pair, the 3D information relating to the scene or area, wherein the generating step excludes a portion of the stereo image pair representing the first object.

Clearly, any feature, object, embodiment, situation and the like may be interchanged between the different aspects of the invention.

In this context, the overall 3D information, the stereo image pair, the obtaining thereof, the generation of the 3D information and the objects may be as described before.

According to this aspect, a portion of the stereo image pair is excluded in the generation of the 3D information. This may be relevant if the first object is of a type which is not relevant in relation to the purpose of the 3D information. For example, if the 3D information is used for navigation, objects may be ignored or left out which are dynamic, very small, very far away, outside of reach of the navigating robot/vehicle/vessel or the like. A bird, the sky, a cloud or a balloon may be irrelevant as may a treetop be to a vehicle.

Different manners exist of excluding the portion representing the first object. In one embodiment, the generating step excludes the portion by generating reduced/augmented first and/or second image(s) and then generates the 3D information based thereon.

Then, a standard method may be used for generating the 3D information. For example, if the first object is identified as a bird, airplane or cloud, it may be replaced in the first and/or second image by the color of the sky. This color may be determined from other, such as adjacent, portion of the first/second image. This is one manner of generating augmented 2D image(s). Thus, the final 3D information will not represent that first object. Also, the method of generating the 3D information may be the usual method, as the information is left out in the 2D images.

In another situation, the generation step comprises generating reduced/augmented first and/or second image(s) in which pixels representing the first object are allocated a predetermined pixel value(s). A pixel may be represented by a plurality of values, such as intensity, wavelength, color contents, rate of intensity change, phase of returned signal, or the like. The radiation from the object may be split into different colors when detected (such as a RBG sensor or a CMY, CYGM, CMYK, or the like) so that the pixel is represented by a number of values which may the intensity of each of the RGB or CMY (M or K) sensors.

The predetermined pixel value may thus be each such values, some thereof or only one, which may be allocated a particular value which is either not usually allocated to a pixel (such as a negative value, a zero or a maximum value) or a combination which is unlikely. The particular value is not relevant as long as the 3D generation process will recognize the value and not generate 3D information for that pixel.

From that value, the 3D information generating step or process may replace the pixel value prior to the generation of the 3D information. Alternatively, the 3D information generating process or step may simply not generate 3D information from that pixel.

In one situation, the pixels representing the first object in both the first and the second image are allocated the predetermined pixel value(s) in the situations described above.

As mentioned, the 3D information generating step may comprise generating the 3D information by generating a disparity between pixels of the first and second images. An embodiment of this step may be one, where the method is configured to not generate a disparity relating to one or more pixels having the predetermined pixel value(s).

In another situation, the 3D information generating method may initially generate the 3D information based also on the first object but may later remove the 3D information relating to the first object. The 3D information generating method may be informed of pixel identities, pixel coordinates or pixel values representing the first object and mark or identify the corresponding 3D information generated from such pixels, so that a subsequent step may remove such 3D information arriving at 3D information in which the object is not represented.

The lack of the information relating to the first object will not be a problem to a subsequent use of the 3D information when the first object is defined to not be of interest or relevance in that context. In one situation, a further step is provided of generating, from the first object, a type or class of the first object. A number of objects may have their types/classes determined in the first/second images, where the first object is then selected based on its type or class. A vast number of methods exist of identifying different types of objects, such as persons, vehicles, birds, buildings and the like, in standard images. Such methods are very useful in this context.

Above, methods are described for determining the 3D information knowing the outline or edge of the object. Such methods may further be used in this context, as the outline or edge of the object is easily discerned from the pixel values.

Then, the method could further comprise the step of determining, from the type or class of the first object, that the object is one or more of: dynamic, static, farther from a predetermined position than a predetermined distance, or irrelevant.

A static object could be a solid structure, a building, a tree, a quay, a pillar, a post or the like, whereas a dynamic object could be a vehicle, a vessel, a person, a bicycle, a buoy or the like.

Objects may also be seen as irrelevant which means that they are not relevant for the purpose of the 3D information. For navigation of a vehicle or vessel, a bird, a balloon, a cloud, the sky, a flying airplane and the like are directly irrelevant. The same is the situation for parts of objects, such as house roofs and treetops, which are not within the height of the vessel or vehicle. Thus, even when represented in the first and second images, 3D information need not be generated for the purpose of navigation, as the position of such objects will never be used for that navigation.

For such navigation, static objects are very relevant, as the relative position between the navigating vehicle and vessel and such static objects will assist the vehicle/vessel in determining where it is.

The dynamic objects may not be relevant for navigation or especially position determining purposes but may be relevant for collision avoidance and may thus be desired in the 3D information.

A fourth aspect of the invention relates to a system for generating 3D information from a stereo image pair, the system comprising:

an obtaining element configured to obtain a stereo image pair comprising a first image and a second image of an area or scene comprising a plurality of objects, a controller configured to:

identify, in at least one of the first image and the second image, a first object of the plurality of objects, generate, from the stereo image pair, the 3D information relating to the scene or area, wherein the generation excludes a portion of the stereo image pair representing the first object.

As described above, all aspects, embodiments, considerations, situations and the like may be as described further above.

Thus, as described above, the controller may be configured to exclude the portion by generating reduced/augmented first and/or second image(s) and generate the 3D information based thereon.

The controller may be configured to generate reduced/augmented first and/or second image(s) in which pixels representing the first object are allocated a predetermined pixel value(s).

The controller may be configured to allocate the predetermined pixel value(s) to pixels representing the first object in both the first and the second image.

The controller may be configured to generate the 3D information by generating a disparity between pixels of the first and second images, where the controller is configured to not generate a disparity relating to one or more pixels having the predetermined pixel value(s). In this situation, the pixel values indicate to the controller that no 3D information is to be generated for that particular pixel.

In other situations, the pixel value may be a pixel value relating to other objects in the first/second image, so that the object is not represented in that image. As an example, if the object is a flying bird, the pixels representing the bird may be replaced by the pixel value of the background sky, so that the bird may be seen as deleted in the image.

The controller may further be configured to determine, from the first object, a type or class of the first object.

The controller may further be configured to determine, from the type or class of the first object, that the object is one or more of: dynamic, static, farther from a predetermined position than a predetermined distance, or irrelevant. Different classes and types are described above.

A fifth aspect of the invention relates to a method of generating 3D information from a stereo image pair, the method comprising:

- obtaining a stereo image pair comprising a first image and a second image of an area or scene comprising a plurality of objects,
- identifying, in the first image and/or the second image, a first object of the plurality of objects,
- obtaining information relating to the shape of the first object,
- generating, from the stereo image pair, 3D information relating to the scene or area, and
- adapting a portion of the 3D information representing the first object based on the obtained shape.

As mentioned, all embodiments, situations, considerations and the like of all aspects may be interchanged. Thus, the stereo image pair, the first and second images, the identification, the objects and the generation of the 3D information may be as described above.

According to this aspect, the 3D information is generated and then adapted. When the first object has been identified, a shape thereof is obtained and the 3D information is adapted based on this shape.

Generation of 3D information inherently is noisy or error prone, so that a plane wall will not be represented in the 3D information as a plane surface. Also, a car, such as a Toyota Prius, may not be represented in the 3D information with a shape closely resembling that of that particular vehicle.

However, when the object has been identified, the shape thereof may be retrieved or generated. This shape may be in the form of a 3D model of the object, such as of that particular model of car or a portion thereof. Then, this known shape may be used for altering the portion of the 3D information representing that car or the portion thereof. In this manner, the 3D information may be altered to more precisely represent the object.

Often, an object will have a different shape when seen at different viewing angles, and the size of the vehicle will seem different when viewed from different distances. Then, in one embodiment,

- the identifying step comprises determining a rotation of the first object and optionally also a distance to the first object, and
- the adapting step comprises adapting the portion of the 3D information based on the shape, the distance and the rotation.

Thus, from the first/second image, the rotation may be determined, such as a vehicle being viewed directly from the front or at a 30 degrees angle to the left of the front. Then, the viewing angle of the model may be selected to be the same.

Also the distance is of interest. This may be determined from the first/second image, such as from an extent of the object in the image. Additionally, or alternatively, the distance may be taken from the portion of the 3D information representing the object. A distance to an object is one of the features easily determined from 3D information.

In this context, the distance may be a distance from a portion of the object to a predetermined position, such as a position of a 3D camera or a camera.

From the distance and the angle, the model may be viewed in the correct manner and the surface of the object may be determined from that information. This surface may then be used for the adaptation of the 3D information.

In one embodiment, a memory comprises a number of shapes for each of a number of objects and wherein the obtaining step comprises obtaining the shape corresponding to the first object. This memory may hold models, such as 3D models, of a large number of objects, as different objects may be different vehicles, vessels, street lamps, models, building years, buildings, surfaces or the like.

It may be desired that the adapting step comprises adapting the portion of the 3D information to more closely resemble the obtained shape. In this context, a closer resemblance would be seen when a shape represented by the initial 3D information has a larger mean distance from a surface represented by the model, than the adapted portion. For example, when the 3D information is represented by a point cloud, the smallest distance from each point to a position and/or a surface representing the shape of the model may be determined for each point of the portion as well as of the portion of the adapted information. The mean distance of the initial portion will be larger than that of the adapted portion.

Other measures for the resemblance between the 3D information and the obtained shape include similarity of moments, measures of planarity or curvature, measures of surface texture, similarity between the parameters of parametric curves, volumes, or surfaces fit to (or intrinsic to) the 3D information and obtained shape, etc.

A final aspect of the invention relates to a system for generating 3D information from a stereo image pair, the system comprising:

- an obtaining element configured to obtain a stereo image pair comprising a first image and a second image of an area or scene comprising a plurality of objects,
- a controller configured to:
- identify, in the first image and/or the second image, a first object of the plurality of objects,
- obtain information relating to the shape of the first object, generate, from the stereo image pair, 3D information relating to the scene or area, and adapt a portion of the 3D information representing the first object based on the obtained shape.

In one embodiment, the controller is configured to have:

the identifying step comprise determining a distance to the first object and a rotation of the first object, and the adapting step comprise adapting the portion of the 3D information based on the shape, the distance and the rotation.

The system preferably further comprises a memory comprising a number of shapes for each of a number of objects and wherein the controller is configured to have the obtaining step comprise obtaining the shape corresponding to the first object. Naturally, the memory may be on the system or remotely accessible. It may be an advantage to have a central model storage addressable by multiple independent systems. Alternatively, shapes may be implicitly encoded in the weights of a convolutional neural network or AI model.

Also, the controller may be configured to have the adapting step comprise adapting the portion of the 3D information to more closely resemble the obtained shape.

BRIEF DESCRIPTION OF THE DRAWINGS

In the following, preferred embodiments of the invention will be described with reference to the drawing, wherein.

DETAILDED DESCRIPTION OF THE INVENTION

Figure 1:
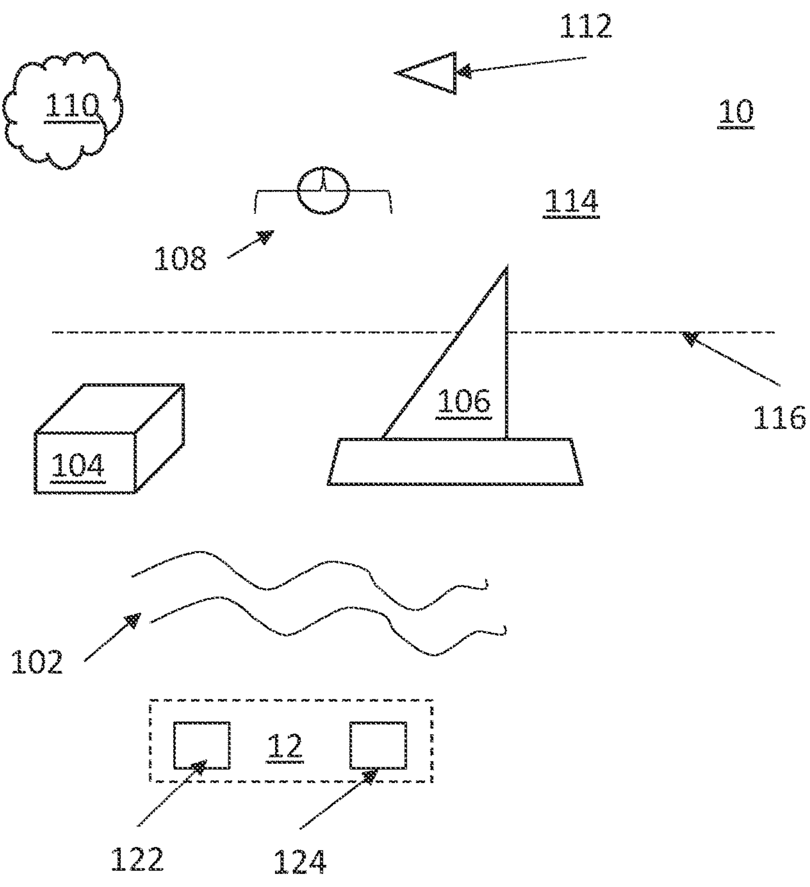
FIG. 1 illustrates a stereo imaging camera and a scene comprising a number of objects.
Figure 3:
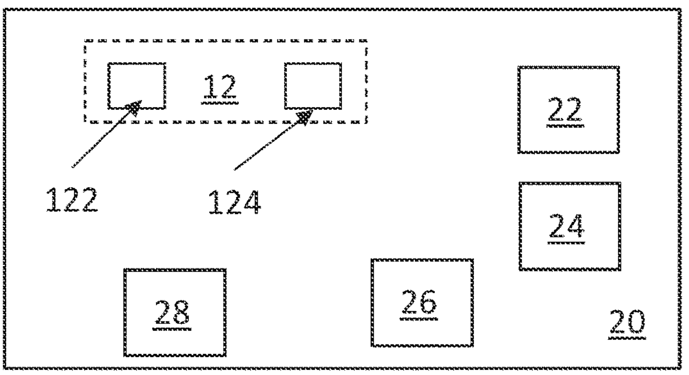
FIG. 3 illustrates a vehicle or vessel navigating in the scene using the 3D information.

In FIG. 1, a maritime scene 10 is illustrated comprising a number of features or objects which may be discerned. The scene comprises a boat or vessel 106, a solid structure, such as a quay 104, water 102, horizon 116, a cloud 110, a seagull 108, an airplane 112 and the sky 114.

Illustrated is also a stereo camera 12 comprising a left camera 122 and a right camera 124.

Using a stereo camera for navigating a robot, vehicle or vessel 20 is known. The output of the 3D camera may be fed to a controller 22 which outputs instructions to a drive 24 driving movement elements, such as wheels, tracks, a rotor, a propeller or the like configured to drive the robot/vessel/vehicle in a desired direction. As described, the output of the camera 12 may also be used also for collision avoidance. In addition, further sensors 28, may be used, such as a LIDAR, RADAR, or the like, which may provide information assisting in the navigation, collision avoidance or the like.

Figure 2L:
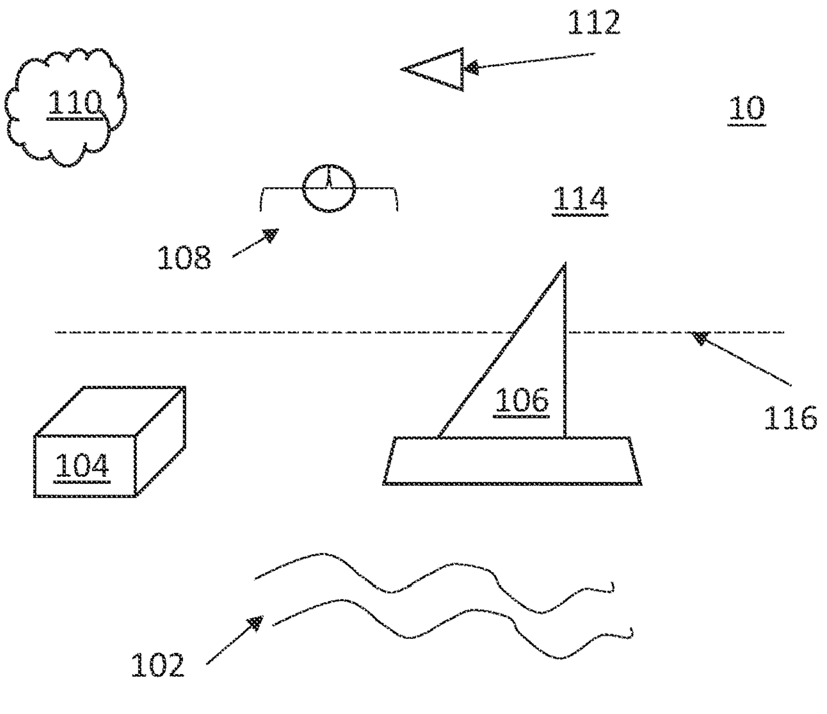
FIGS. 2L and 2R illustrate the left and right images of the scene of FIG. 1.
Figure 2R:
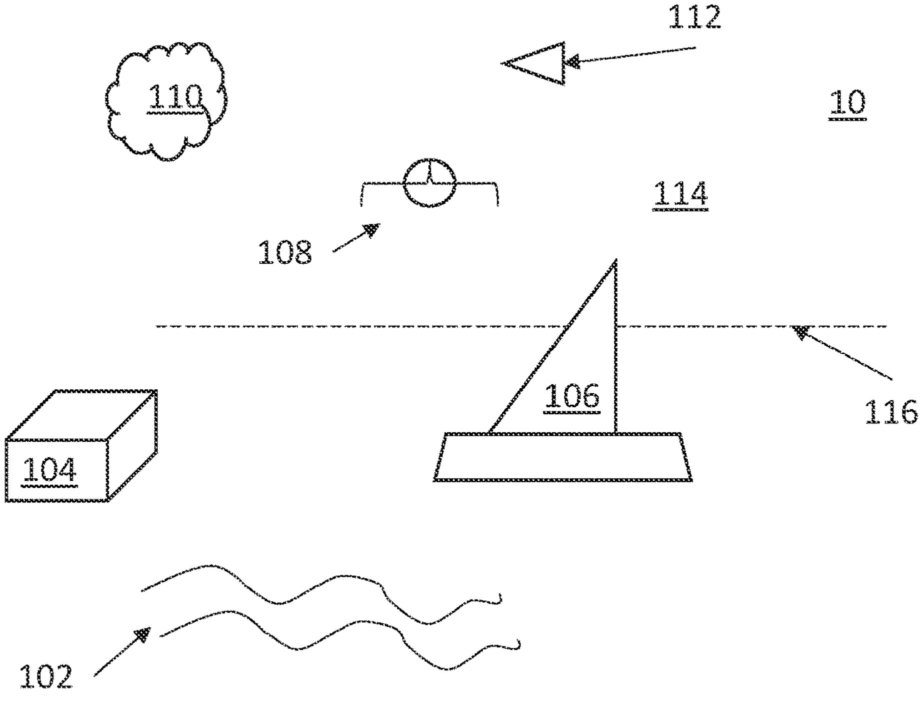

In a standard stereo camera set-up, the two cameras 122 and 124, which will be positioned and directed in a well-defined manner in relation to each other, will each take an image at least substantially simultaneously, and 3D information will be generated by determining the position, in the two images seen in FIGS. 2L and 2R, of the same portions of the objects, such as the tip of the sail of the boat 106.

FIG. 2L illustrates the scene 10 seen from the left camera 122 and FIG. 2R illustrates the scene 10 seen from the right camera 124. It is seen that the largest displacement between the two images is seen at the objects which are the closest to the camera.

Based on the 3D information, the relative positions of the objects may be determined, as well as information relating to the relative positions of the objects and the camera 12, and this information may be used for navigating a vehicle or vessel carrying the camera 12 in relation to the objects.

According to the invention, at least one of the objects is identified in the image from one of the cameras 122 and 124. Object identification in standard 2D images is well known and may be performed very swiftly. An object may be one element of a given type, such as a tree or a bird, but may also be a number of such elements, such as one or more groups of trees. The object may represent one or multiple clusters of interconnected or neighbouring pixels.

In some situations, it may be desired to define, as an object, a number of elements of different types, such as if all such elements may have the same importance or usefulness in a step using the resulting 3D information. For example, all elements in the image which are not relevant for navigation purposes, such as both the sky, the cloud, the airplane and the bird, may be seen as one object.

An object may be represented in a number of manners. In one manner, the object is defined or represented by the IDs of the pixels representing the object in the 2D image(s). In another situation, such pixels are altered to remove the object from the image or in order to inform a subsequent process that no 3D information should be generated from such pixels.

Thus, the boat 106, the seagull 108 and/or the structure 104 may be identified in the image from the camera 124.

Different operations may now be performed on the basis of the identified object(s) and the two images. This may e.g. depend on a type of object which is identified. Each object, or at least one of the objects, may be classified and/or have its type determined.

Classification or type determination may be used for a number of purposes. It may be desired to classify or allocate a type to objects which are assumed to be stationary (such as the quay 104) and objects which are assumed to be dynamic (such as the boat 106 and the seagull 108). Also, or alternatively, objects may be divided into (classified as) relevant and irrelevant objects for a particular purpose, such as for navigation of a vessel or boat. Relevant objects may be the quay 104 and the boat 106, whereas irrelevant objects would be the sky 114, the cloud 110, the airplane 112, the seagull 108 and the horizon 116. Also, the water 102 may not be relevant.

Then, an identified object may be classified or have its type determined from the 2D image. This classification may then be used in different manners.

In one situation, the information of an object, such as the classification, weight, importance, type or the like thereof, may be carried over to the portion of the 3D information identified as relating to the same object. 3D information may be generated as always from the images from the cameras 122 and 124, but now the 3D information relating to one or more of the identified objects 104, 106, 108—or any of the other objects—may be identified in the 3D information based on the object's position in the original 2D image. Thus, classification of objects in or portions of the 3D information may now be based on the classification or the like made in the 2D image(s). In one situation, the pixels representing the object may be identified to the 3D information generating process, such as by the pixels having a particular value or simply by the identity (coordinate for example) of the pixels or an outer boundary/ies of the cluster(s) of pixels representing the object.

During generation of the 3D information, pixels in the image from the camera 122 are matched with pixels in the image from the camera 124. When a pixel representing the object is matched to arrive at a 3D position in the space in front of the camera 12, that position or that information may be noted to relate to the object in question. Thus, in the 3D information, a number of these 3D positions will belong to the object, so that the corresponding area or positions in the scene may represent the object. In that situation, the 3D positions or information need not itself be used for classification of the object.

In another situation, 3D information may not even be generated relating to the identified object, such as if the object has been classified as dynamic, irrelevant or the like. By not generating this 3D information, the overall speed of the generation of the 3D information may be sped up. In this situation, the non-generation of the 3D information may be obtained in different manners. In one manner, the portions of the 2D image relating to the particular object may be given a particular pixel value, where the generation of the 3D information then is configured to discard pixels with that value. In one manner, the pixels representing the object may be given another value, such as a value of surroundings of the object so as to virtually erase the object from the image (e.g. replacing the seagull by the colour of the background sky). In another manner, information may be generated as to which pixels represent the object, so that the 3D generation may ignore these. Thus, a slight amendment of the 3D generation process may be desired.

Figure 4:
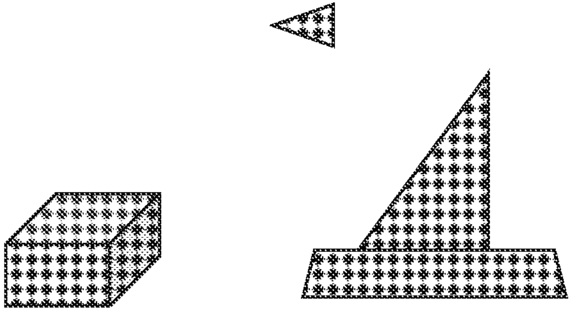
FIG. 4 illustrates 3D information relating to relevant, stationary or dynamic objects of the scene 1.

In FIG. 4, 3D information in the form of point clouds corresponding to or representing the vessel and the quay as well as the airplane are seen. The seagull is not represented, as the 3D information thereof has not been generated or has been removed subsequent to generation.

In yet another situation, which may easily be combined with any of the other situations, the identification of the object in the 2D image allows the determination of an outline or outer boundary of the object. Such boundary or outline may be determined based on knowledge of the type and/or shape of the object, from a ML image processing algorithm or from pixel colours at the boundary or the like. For example, a hanging wire or an outer shape of a sail may be determined or even estimated based on a mathematical model of the shape or phenomena causing it (f.ex. gravity). Alternatively, different types of objects may be known beforehand, such as a particular type of vessel or car (e.g. a Toyota Prius), so that the outline may be determined in the 2D image.

In usual 3D information generation, noise or imprecision is often seen in areas where boundaries are seen, in the 2D images, of objects. This sudden difference in depth may confuse the 3D information generating method.

Then, information relating to the outline, outermost pixels and/or boundary may be fed to the 3D generating process/processor which may then remove only the relevant portions of the 3D information and/or allow large depth differences around these boundaries.

Also, as pixel matching during generation of the 3D information (often called disparity) is not always perfect, a perfectly plane wall may be represented in the 3D information as a far from plane wall due to this imperfection.

In that regard, shapes of surfaces of the identified object may be determined from the 2D information, may be known or may be predictable, so that the corresponding 3D information may be enhanced by being adapted to the known shape of that surface. For example, a plane wall of a building or structure may be identified, so that the corresponding 3D information represents a straight structure surface. This may be obtained by informing the 3D information generation of the pixels relating to this wall, so that the corresponding 3D information may represent a plane surface.

Naturally, if the surface is recognized as a surface, the shape of which may not be predicted, such as a rough surface of a rock, a bush or the like, the 3D generation may take place as usual.

In the other manner, the 3D generation may receive a list of pixels (typically coordinates in the 2D image) which may be ignored or for which no 3D information is required.

An addition to or alternative to the forwarding of additional information to the 3D generation is to derive augmented or reduced 2D images from the images generated by the cameras 122/124, where the reduction/augmentation is the replacement, in one or both thereof, of the pixel values of the pixels representing the object to a predetermined pixel value. In one situation, the pixels receive a value allowing the 3D generating process to generate 3D information which is not relevant, such as when the pixels representing the seagull are given the colour of the background sky so that 3D information is instead generated for the sky. In another situation, this predetermined value is recognizable by the 3D generating procedure/process/processor and may cause this procedure/process/processor to not generate the corresponding 3D information.

Objects may have different classifications or relevance in different situations.

If the stereo camera and/or 3D information is used for navigation, relevant objects may be objects close-by, such as objects within a predetermined distance (which may be determined continuously and/or depend on a type or speed of a vehicle/vessel to be navigated), objects which are assumed to be stationary (house, tree trunks, masts, quay etc), objects (or portions thereof) which are at a particular vertical height (tree trunk) and/or objects which are assumed to be dynamic (boats, vessels, cars, trains, bicycles, pedestrians, animals, persons).

Irrelevant objects may be objects which are farther than the predetermined distance (sky, cloud, airplane, bird), distances which are above a particular vertical height (treetop, airplane, birds, sky), objects which are too small or otherwise ignorable (birds, balloons).

The navigation of a vessel or vehicle may be desired based on the relevant objects and even only some of the objects. Navigation may be desired based only on stationary objects, as the position thereof may be fixed and known so that the relative position to the vehicle/vessel may be determined. Dynamic objects may be used for collision avoidance but perhaps not for position determination. In relation to a dynamic object, a safety distance or envelope may be determined, so that the vehicle/vessel passes the dynamic object at a safe distance. Alternatively, or additionally, a trajectory of the dynamic object may be estimated, and the navigation of the vessel/vehicle determined so that a collision is avoided. Clearly, a trajectory may be estimated based on a type of object and may optionally be used for generating a safety envelope around the object. The estimated trajectory/envelope of a car is more straight (but the speed is expected to be higher) than that of a bicycle or a pedestrian.

Irrelevant objects often are excluded from the navigation and may even be disregarded completely also in relation to collision avoidance.

For use in relation to a vessel, relevant objects would be stationary objects, such as the quay 104, as well as dynamic objects, which could be the boat 106. Other relevant objects would be buoys which are not completely stationary but also not completely dynamic. A buoy may move slightly sideways and will move vertically to follow waves, tides and the like.

On the other hand, the sky, seagulls, clouds, airplanes, the horizon but also in general the water surface may be irrelevant. Thus, the objects of real relevance may be reduced greatly, so that the generation of the 3D information may be sped up and the navigation thus take place based on more updated data.

For use on solid ground, such as for navigation of a vehicle, relevant objects may be buildings, vehicles, trees, pedestrians, animals and the like. Navigation may be performed based on buildings and perhaps trees (preferably the lower portions thereof; trees will not move but may be cut down), and collision avoidance may be based on positions and perhaps estimated trajectories of vehicles, pedestrians, and animals. Irrelevant objects may be birds, treetops, airplanes, clouds, the sky and even the road/sidewalk/bicycle paths. Objects which are too far away (often in a horizontal direction) may also be ignored, where the relevant distance may relate to a velocity of the vehicle and potentially of the object.

OBJECTS

In the following, interesting objects of an invention are described

1. A method of generating 3D information from a stereo image pair, the method comprising:
   - obtaining a stereo image pair comprising a first image and a second image of an area or scene comprising a plurality of objects,
   - identifying, in at least one of the first image and the second image, a first object of the plurality of objects,
   - generating, from the stereo image pair, the 3D information relating to the scene or area, and
   - wherein the generating step excludes a portion of the stereo image pair representing the first object.

2. A method according to object 1, wherein the generating step excludes the portion by generating reduced/augmented first and/or second image(s) and generates the 3D information based thereon.

3. A method according to object 2, wherein the generation step comprises generating reduced/augmented first and/or second image(s) in which pixels representing the first object are allocated a predetermined pixel value(s).

4. A method according to object 3, wherein the pixels representing the first object in both the first and the second image are allocated the predetermined pixel value(s).

5. A method according to any of objects 3 and 4 in which the generation step comprises generating the 3D information by generating a disparity between pixels of the first and second images, where the method is configured to not generate a disparity relating to one or more pixels having the predetermined pixel value(s).

6. A method according to any of the preceding objects, further comprising the step of generating, from the first object, a type or class of the first object.

7. A method according to object 6, further comprising the step of determining, from the type or class of the first object, that the object is one or more of: dynamic, static, farther from a predetermined position than a predetermined distance, or irrelevant.

8. A system for generating 3D information from a stereo image pair, the system comprising:
   - an obtaining element configured to obtain a stereo image pair comprising a first image and a second image of an area or scene comprising a plurality of objects,
   - a controller configured to:
   - identify, in at least one of the first image and the second image, a first object of the plurality of objects,
   - generate, from the stereo image pair, the 3D information relating to the scene or area, wherein the generation excludes a portion of the stereo image pair representing the first object.

9. A system according to object 8, wherein the controller is configured to exclude the portion by generating reduced/augmented first and/or second image(s) and generate the 3D information based thereon.

10. A system according to object 9, wherein the controller is configured to generate reduced/augmented first and/or second image(s) in which pixels representing the first object are allocated a predetermined pixel value(s).

11. A system according to object 10, wherein the controller is configured to allocate the predetermined pixel value(s) to pixels representing the first object in both the first and the second image.

12. A system according to any of objects 10 and 11, wherein the controller is configured to generate the 3D information by generating a disparity between pixels of the first and second images, where the controller is configured to not generate a disparity relating to one or more pixels having the predetermined pixel value(s).

13. A system according to any of objects 8-12, wherein the controller is further configured to determine, from the first object, a type or class of the first object.

14. A system according to object 13, wherein the controller is further configured to determine, from the type or class of the first object, that the object is one or more of:
   - dynamic, static, farther from a predetermined position than a predetermined distance, or irrelevant.

15. A method of generating 3D information from a stereo image pair, the method comprising:
   - obtaining a stereo image pair comprising a first image and a second image of an area or scene comprising a plurality of objects,
   - identifying, in the first image and/or the second image, a first object of the plurality of objects,
   - obtaining information relating to the shape of the first object,
   - generating, from the stereo image pair, 3D information relating to the scene or area, and
   - adapting a portion of the 3D information representing the first object based on the obtained shape.

16. A method according to object 15, wherein:
   - the identifying step comprises determining a distance to the first object and a rotation of the first object, and
   - the adapting step comprises adapting the portion of the 3D information based on the shape, the distance and the rotation.

17. A method according to any of object s 15 and 16, wherein a memory comprises a number of shapes for each of a number of objects and wherein the obtaining step comprises obtaining the shape corresponding to the first object.

18. A method according to any of object s 15-17, wherein the adapting step comprises adapting the portion of the 3D information to closer resemble the obtained shape.

19. A system for generating 3D information from a stereo image pair, the system comprising:

an obtaining element configured to obtain a stereo image pair comprising a first image and a second image of an area or scene comprising a plurality of objects, a controller configured to:

identify, in the first image and/or the second image, a first object of the plurality of objects, obtain information relating to the shape of the first object, generate, from the stereo image pair, 3D information relating to the scene or area, and adapt a portion of the 3D information representing the first object based on the obtained shape.

20. A system according to object 19, wherein the controller is configured to have:

the identifying step comprise determining a distance to the first object and a rotation of the first object, and the adapting step comprise adapting the portion of the 3D information based on the shape, the distance and the rotation.

21. A system according to any of objects 19 and 20, further comprising a memory comprising a number of shapes for each of a number of objects and wherein the controller is configured to have the obtaining step comprise obtaining the shape corresponding to the first object.

22. A system according to any of objects 19-21, wherein the controller is configured to have the adapting step comprise adapting the portion of the 3D information to closer resemble the obtained shape.

The invention claimed is:

1. A method of generating object information from a stereo image pair, the method comprising:

obtaining a stereo image pair comprising a first 2D image and a second 2D image of an area or scene comprising a plurality of objects, identifying, in the first 2D image and/or the second 2D image, a first object and a second object of the plurality of objects, the second object being dynamic, generating, from the stereo image pair, 3D information relating to the scene or area, including excluding a portion of the stereo image pair representing the second object before generating said 3D information, identifying, based on the identified first object, a portion of the 3D information relating to the first object, the object information relating to the generated information, and navigating in the area or scene based on the generated 3D information.

2. The method according to claim 1, further comprising the step of deriving shape information relating to a shape of a surface of the identified first object, wherein the generating step comprises generating, based on the shape information, a portion of the 3D information relating to the surface to have a shape corresponding to the shape of the surface.

3. The method according to claim 1, the method further comprising the step of navigating in the area or scene based on the identified portion of the 3D information, wherein the first object is a stationary object.

4. A system for generating object information from a stereo image pair, the system comprising:

an obtaining element configured to obtain a stereo image pair comprising a first 2D image and a second 2D image of an area or scene comprising a plurality of objects, a controller configured to:

identify, in the first 2D image and/or the second 2D image, a first object and a second object of the plurality of objects, the second object being dynamic, generate, from the stereo image pair, 3D information relating to the scene or area, wherein a portion of the stereo image pair representing the second object is excluded before generating said 3D information, identify, based on the identified first object, a portion of the 3D information relating to the first object, the object information relating to the generated information, and navigate in the area or scene based on the generated 3D information.

5. The system according to claim 4, wherein the controller is further configured to:

derive shape information relating to a shape of a surface of the identified first object, and have the generating step comprise generating, based on the shape information, a portion of the 3D information relating to the surface to have a shape corresponding to the shape of the surface.

6. The system according to claim 4, the controller further being configured to navigate in the area or scene based on the identified portion of the 3D information, wherein the first object is a stationary object.

7. A method of generating 3D information from a stereo image pair, the method comprising:

obtaining a stereo image pair comprising a first 2D image and a second 2D image of an area or scene comprising a plurality of objects, identifying, in at least one of the first 2D image and the second 2D image, a first object of the plurality of objects, generating, from the stereo image pair, the 3D information relating to the scene or area, and wherein a portion of the stereo image pair representing the first object is excluded before generating said 3D information.

8. The method according to claim 7, wherein the identifying step comprises allocating to the portions of the 2D images relating to the object, a predetermined pixel value, and wherein the generating step comprises ignoring pixels with the predetermined pixel value.

9. The method according to claim 7, the method further comprising the step of navigating in the area or scene based on the identified portion of the 3D information, wherein the first object is a stationary object.

10. A system for generating 3D information from a stereo image pair, the system comprising:

an obtaining element configured to obtain a stereo image pair comprising a first 2D image and a second 2D image of an area or scene comprising a plurality of objects, a controller configured to:

identify, in at least one of the first 2D image and the second 2D image, a first object of the plurality of objects, generate, from the stereo image pair, the 3D information relating to the scene or area, wherein a portion of the stereo image pair representing the first object is excluded before generating said 3D information.

11. The system according to claim 10, wherein the controller is configured to, in the identifying, allocate to the portions of the 2D images relating to the object, a predetermined pixel value, and, in the generating step, ignoring pixels with the predetermined pixel value.

12. The system according to claim 10, the controller further being configured to navigate in the area or scene based on the identified portion of the 3D information, wherein the first object is a stationary object.

13. A method of generating 3D information from a stereo image pair, the method comprising:

obtaining a stereo image pair comprising a first 2D image and a second 2D image of an area or scene comprising a plurality of objects, identifying, in the first 2D image and/or the second 2D image, a first object of the plurality of objects, obtaining information relating to a shape of the first object, generating, from the stereo image pair, 3D information relating to the scene or area, and adapting a portion of the 3D information representing the first object to resemble the obtained shape.

14. The method according to claim 13, the method further comprising the step of navigating in the area or scene based on the identified portion of the 3D information, wherein the first object is a stationary object.

15. A system for generating 3D information from a stereo image pair, the system comprising:

an obtaining element configured to obtain a stereo image pair comprising a first 2D image and a second 2D image of an area or scene comprising a plurality of objects, a controller configured to:

identify, in the first 2D image and/or the second 2D image, a first object of the plurality of objects, obtain information relating to a shape of the first object, generate, from the stereo image pair, 3D information relating to the scene or area, and adapt a portion of the 3D information representing the first object based on to resemble the obtained shape.

16. The system according to claim 15, the controller further being configured to navigate in the area or scene based on the identified portion of the 3D information, wherein the first object is a stationary object.

* * * * *